US012670295B2

(12) United States Patent
Prevrhal et al.

(10) Patent No.: US 12,670,295 B2
(45) Date of Patent: Jun. 30, 2026

(54) DATA DE-IDENTIFICATION

(71) Applicant: KONINKLIJKE PHILIPS N.V.,
Eindhoven (NL)

(72) Inventors: Sven Peter Prevrhal, Hamburg (DE);
Ingmar Graesslin, Boenningstedt (DE);
Thomas Buelow, Grosshansdorf (DE)

(73) Assignee: KONINKLIJKE PHILIPS N.V.,
Eindhoven (NL)

( * ) Notice: Subject to any disclaimer, the term of this
patent is extended or adjusted under 35
U.S.C. 154(b) by 160 days.

(21) Appl. No.: 18/689,895

(22) PCT Filed: Sep. 5, 2022

(86) PCT No.: PCT/EP2022/074541
§ 371 (c)(1),
(2) Date: Mar. 7, 2024

(87) PCT Pub. No.: WO2023/036717
PCT Pub. Date: Mar. 16, 2023

(65) Prior Publication Data
US 2024/0386140 A1 Nov. 21, 2024

Related U.S. Application Data

(60) Provisional application No. 63/243,352, filed on Sep.
13, 2021.

(51) Int. Cl.
G06F 21/00 (2013.01)
G06F 21/62 (2013.01)

(52) U.S. Cl.
CPC ................................. G06F 21/6254 (2013.01)

(58) Field of Classification Search
CPC .................................................... G06F 21/6254
See application file for complete search history.

(56) References Cited

U.S. PATENT DOCUMENTS

| | | | | |
|---|---|---|---|---|
| 10,192,415 B2 * | 1/2019 | Heitz, III | ......... | G08B 13/19656 |
| 10,693,872 B1 * | 6/2020 | Larson | .................... | G06F 21/32 |
| 2005/0111762 A1 | 5/2005 | Mathew | | |
| 2008/0240425 A1 | 10/2008 | Rosales | | |

(Continued)

FOREIGN PATENT DOCUMENTS

| | | |
|---|---|---|
| WO | 2019/086365 A1 | 5/2019 |
| WO | 2019/201968 A1 | 10/2019 |

OTHER PUBLICATIONS

Kougianos et al. "Design of a High-Performance System for Secure
Image Communication in the Internet of Things," in IEEE Access,
vol. 4, pp. 1222-1242 (Year: 2016).*

(Continued)

*Primary Examiner* — Morshed Mehedi

(57) ABSTRACT

A system (100) for transferring data (110) generated by a
medical imaging system over a communication network
(120), is provided. The system includes a processing
arrangement (130, 140) configured to identify (S120) one or
more protected health information, PHI, elements (110') in
the data (110); obscure (S130) the one or more PHI elements
(110') in the data (110) to provide de-identified data (110");
transmit (S140) the de-identified data (110") over the com-
munication network (120); and receive (S150) the de-iden-
tified data (110") at a remote terminal (150).

15 Claims, 3 Drawing Sheets

(56)                    References Cited

U.S. PATENT DOCUMENTS

| | | | |
|---|---|---|---|
| 2011/0110572 A1* | 5/2011 | Guehring ............. | A61B 6/5258 |
| | | | 382/128 |
| 2013/0054268 A1 | 2/2013 | Beymer | |
| 2016/0224805 A1 | 8/2016 | Patti | |
| 2018/0268164 A1* | 9/2018 | Minami ................ | G06F 21/105 |
| 2018/0276248 A1* | 9/2018 | Burkett .................. | G16H 30/20 |
| 2020/0118317 A1* | 4/2020 | Mysore Siddu ....... | G06V 40/16 |
| 2021/0065881 A1* | 3/2021 | Sargent .................. | G06N 3/094 |
| 2021/0365739 A1* | 11/2021 | Carmena ............... | G06F 18/217 |
| 2021/0392118 A1* | 12/2021 | Sughrue ................ | G06T 7/0012 |
| 2022/0343499 A1* | 10/2022 | Yousfi ................... | G16H 30/40 |

OTHER PUBLICATIONS

Shabbir et al., "Enhancing Security of Health Information Using Modular Encryption Standard in Mobile Cloud Computing," in IEEE Access, vol. 9, pp. 8820-8834 (Year: 2021).*
International Search Report and Written Opinion Dated Dec. 16, 2022 for International Application No. PCT/EP2022/074541 Filed Sep. 5, 2022.
Eu: "Regulation (EU) 2017/745 on medical devices (Corrigendum)", EUR-lex, Apr. 24, 2020 (Apr. 24, 2020), Retrieved from the Internet: URL:https://eur-lex.europa.eu/legal-conten t/EN/TXT/?uri=CELEX%3A02017R0745-20200424.
"Regulation (EU) 2016/679—GDPR", May 4, 2016 (May 4, 2016), Retrieved from the Internet: URL:https://eur-lex.europa.eu/eli/reg/2016 /679/oj.
Bischoff-Grethe, et al.: "A Technique for the Deidentification of Structural Brain MR Images", Human Brain Mapping, vol. 28, No. 9, Sep. 1, 2007 (Sep. 1, 2007), pp. 892-903.

* cited by examiner

DATA DE-IDENTIFICATION

CROSS REFERENCE TO RELATED APPLICATIONS

This application is the U.S. National Phase application under 35 U.S.C. § 371 of International Application No. PCT/EP2022/074541 filed Sep. 5, 2022, which claims the benefit of U.S. Provisional Patent Application No. 63/243, 352 filed Sep. 13, 2021. These applications are hereby incorporated by reference herein.

TECHNICAL FIELD

The present disclosure relates to the de-identification of data that is generated by a medical imaging system. A system, a computer-implemented method, and a computer program product, are disclosed.

BACKGROUND

In the medical field there is often a need to transmit data that might include personal health information "PHI". In particular, this need arises when transmitting data in order to perform servicing or maintenance operations on medical imaging systems such as X-ray imaging systems, computed tomography "CT" imaging systems, magnetic resonance imaging "MRI" systems, and so forth. For example, if a CT medical imaging system generates a spurious image artifact, an operator of the medical imaging system at a healthcare facility, may desire to send an image that includes the artifact to a service engineer in order for them to investigate its root cause. Similarly, a service engineer visiting the healthcare facility in order to investigate the cause of an image artifact, may desire to send an image that includes the artifact to another service engineer, or to a central servicing facility, for further analysis.

Image data generated by medical imaging systems, as well as other types of data generated by medical imaging systems, might however include PHI elements such as a patient's name, date of birth, and so forth, as well as non-PHI elements such as the spurious image artifact. In order to perform the desired servicing or maintenance operation on the medical imaging system, a service engineer may need to view some of the non-PHI elements of the data, such as the image artifact, but has no interest in receiving the PHI elements. PHI data is also subject to various privacy regulations, and safeguards must be put in-place to ensure that the PHI data is not mis-used.

A current technique for handling data that might include PHI is data encryption. However, there are drawbacks to data encryption. For example, after de-encryption by a legitimate recipient, safeguards must be put in-place to ensure that access to the data continues to be restricted. Thus, it may be necessary for the data to be re-encrypted, or securely deleted, in order to avoid the risk of its subsequent mis-use. This hampers the processing of data when performing servicing and maintenance operations.

Consequently, there is room for improvements when transferring data generated by medical imaging systems in order to perform servicing or maintenance operations.

SUMMARY

According to one aspect of the present disclosure, a system for transferring data generated by a medical imaging system over a communication network, is provided. The data includes one or more non-PHI elements and one or more PHI elements. The system includes a processing arrangement configured to:

- receive the data;
- identify the one or more protected health information, PHI, elements in the data;
- obscure the one or more PHI elements in the data to provide de-identified data comprising the one or more non-PHI elements;
- transmit the de-identified data over the communication network; and
- receive the de-identified data at a remote terminal for analysing the one or more non-PHI elements in the de-identified data and for outputting analysis data corresponding to the non-PHI elements for performing a servicing or a maintenance operation on the medical imaging system.

In so doing, it can be ensured that the data is received at the remote terminal for performing the servicing or maintenance operation on the medical imaging system, without the risk of further dissemination of the PHI.

Further aspects, features, and advantages of the present disclosure will become apparent from the following description of examples, which is made with reference to the accompanying drawings.

DETAILED DESCRIPTION

Figure 1:
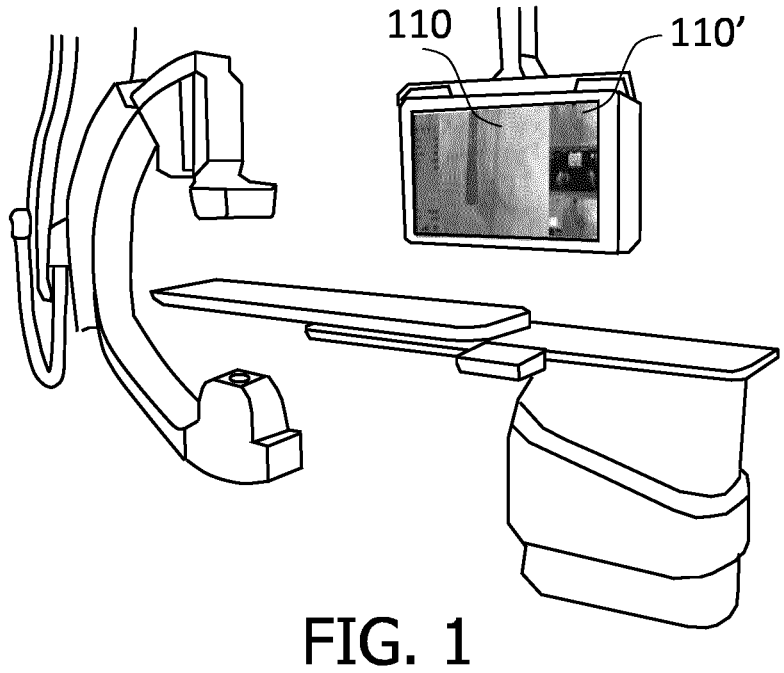
FIG. 1 is a schematic diagram illustrating an example of a medical imaging arrangement including an X-ray imaging system, and a medical image generated by the imaging system that includes PHI elements 110'.

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a system, may be implemented in a computer implemented method, and in a computer program product, in a corresponding manner.

Examples of the present disclosure are described in relation to a processing arrangement wherein a first processor disposed at a first location de-identifies and transmits de-identified data to remote terminal that is disposed at a second location. In some examples the remote terminal includes a second processor for analysing the data and for outputting analysis data for performing a servicing or a maintenance operation on the medical imaging system. However, it is to be appreciated that the processing arrangement is not limited to these particular examples, and that operations that are performed by the processing arrangement may in general be performed by a different configuration of processors. Examples of the present disclosure may alternatively be implemented by processors that are shared within a networked processing architecture such as a client/server architecture, a peer-to-peer architecture, the internet, or the Cloud. Thus, in alternative processing configurations there may be more than one individual processor in each location, or alternatively some, or indeed all of the processing described as taking place in a particular location, may take place at yet another remote location.

It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The functions of one or more of the method features may for instance be provided by processors that are shared within a networked processing architecture such as a client/server architecture, the internet, or the Cloud. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W", Blu-Ray™ and DVD.

As mentioned above, in the medical field there is often a need to transmit data that might include personal health information "PHI". In particular, this need arises when transmitting data in order to perform servicing or maintenance operations on medical imaging systems such as X-ray imaging systems, computed tomography "CT" imaging systems, magnetic resonance imaging "MRI" systems, and so forth. However, when performing such servicing or maintenance operations, it is neither necessary nor desirable to transmit the PHI. In order to perform the desired servicing or maintenance operation on the medical imaging system, a service engineer only needs to view some of the non-PHI elements of the data, such as image artifacts, and has no interest in receiving the PHI elements PHI is defined as any piece of information in an individual's medical record that was created, used, or disclosed during the course of diagnosis or treatment that can be used to personally identify them. Examples of PHI data include an individual's name, address (including subdivisions smaller than state such as street address, city, county, or zip code), dates (except years) that are directly related to the individual, including birthday, date of admission or discharge, date of death, or the exact age of individuals older than 89, telephone number, fax number, email address, social security number, medical record number, health plan beneficiary number, account number, certificate/license number, vehicle identifiers, serial numbers, or license plate numbers, device identifiers or serial numbers, web URLs, IP address, biometric identifiers such as fingerprints or voice prints, full-face photos, and any other unique identifying numbers, characteristics, or codes.

Various privacy regulations, including the HPII Privacy Rule in the USA, govern the use of PHI in order to prevent its mis-use. In a corresponding manner, the General Data Protection Regulation "GDPR" in Europe governs the use of personal data that may be used to identify an individual. Similar privacy regulations are also in-place in other jurisdictions. Consequently, when performing servicing or maintenance operations on medical imaging systems, it is important to ensure that safeguards are in-place to avoid the possibility of the PHI being mis-used.

By way of an example, FIG. 1 is a schematic diagram illustrating an example of a medical imaging arrangement including an X-ray imaging system, and a medical image generated by the imaging system that includes PHI elements $110'$. In the example illustrated in FIG. 1, the medical image is displayed on a monitor. Examples of PHI elements $110'$ that may be displayed in the medical image illustrated in FIG. 1 include a patient's name, the patient's date of birth, and a registration number of the patient at a medical imaging facility. Other PHI elements may also be present in the medical image. For example, a characteristic shape of the patient's skull that is visible in the X-ray image, or a characteristic size of the patient's bones, may also be used to identify the patient. An operator of the medical imaging system at the medical imaging facility may desire to transmit the medical image illustrated on the monitor in FIG. 1 to a service engineer or to a servicing facility for further analysis in order to investigate the origin of an image quality issue such as an image artifact in the image. The medical image may be transmitted by taking a screenshot or screengrab of the medical image displayed on the monitor using a computer attached to the monitor, and transmitting the screenshot using an email application, a messaging application, or by uploading the image to a server. This operation needs to be performed in a manner that avoids the possibility for PHI elements in the medical image to be mis-used.

Figure 2:
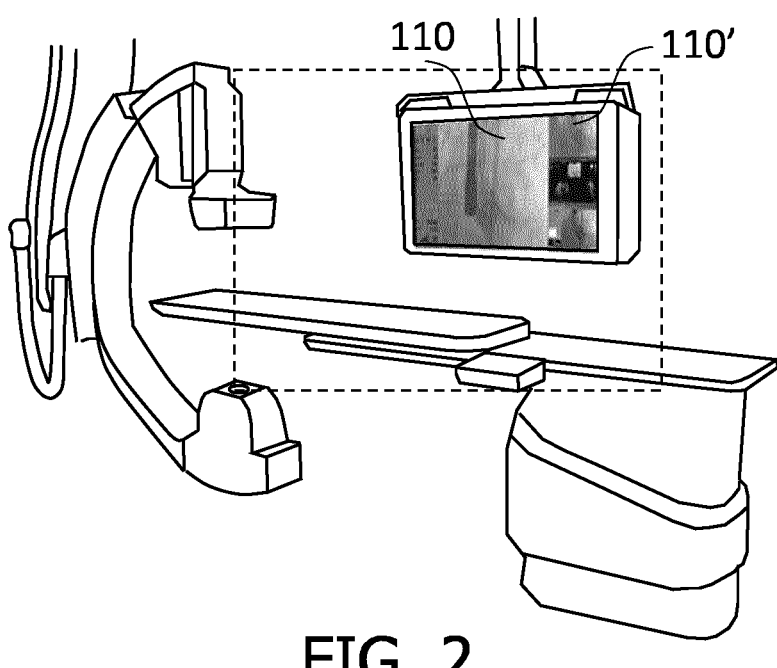
FIG. 2 is a schematic diagram illustrating an example of a camera image, corresponding to the view within the dashed lines, of a medical imaging arrangement that includes PHI elements 110'.

By way of another example, FIG. 2 is a schematic diagram illustrating an example of a camera image, corresponding to the view within the dashed lines, of a medical imaging arrangement that includes PHI elements 110'. The medical imaging arrangement in FIG. 2 corresponds to the medical imaging arrangement in FIG. 1, and also includes corresponding PHI elements 110'. In the FIG. 2 example, a service engineer, or an operator of the medical imaging system at the medical imaging facility, may desire to transmit the camera image to another service engineer or to a servicing facility for further analysis in order to investigate the origin of an image quality issue such as an image artifact in the image. Such a scenario may arise when a service engineer attends an imaging procedure in order to investigate such image artifacts. It may be convenient for the service engineer to capture such camera images using a mobile device such as a smartphone or a laptop. As in the example of FIG. 1, the image may be transmitted using an email application, a messaging application, or by uploading the image to a server, for example. This operation also needs to be performed in a manner that avoids the possibility for PHI elements in the medical image to be mis-used.

It is to be appreciated that the examples illustrated in FIG. 1 and FIG. 2 serve only as examples, and that in other scenarios, other types of data generated by medical imaging systems that include PHI elements may need to be transmitted in a similar manner, as described in more detail below.

Figure 3:
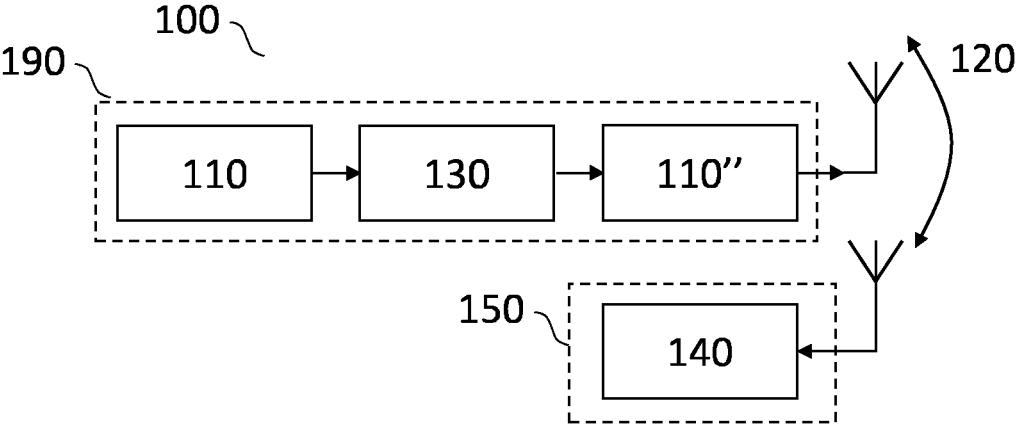
FIG. 3 is a schematic diagram illustrating an example of a system 100 for transferring data over a communication network 110, in accordance with some aspects of the present disclosure.
Figure 4:
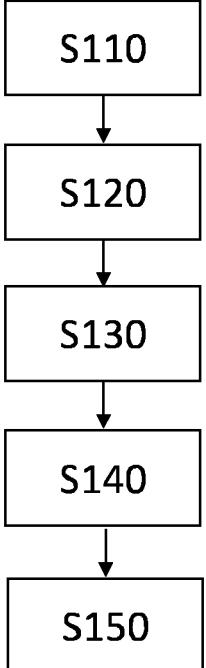
FIG. 4 is a flowchart illustrating an example of a method for transferring data over a communication network 110, in accordance with some aspects of the present disclosure.

FIG. 3 is a schematic diagram illustrating an example of a system 100 for transferring data over a communication network 110, in accordance with some aspects of the present disclosure. FIG. 4 is a flowchart illustrating an example of a method for transferring data over a communication network 110, in accordance with some aspects of the present disclosure. The operations performed by the system 100 illustrated in FIG. 3 are described in detail below, and it is to be appreciated that these operations may be performed in a corresponding manner in accordance with the method illustrated in FIG. 4. Likewise, operations described in relation to the method illustrated in FIG. 4, may also be performed in a corresponding manner by the system illustrated in FIG. 3.

With reference to FIG. 3, a system 100 for transferring data 110 generated by a medical imaging system over a communication network 120, is provided. The data includes one or more non-PHI elements and one or more PHI elements. The system includes a processing arrangement 130, 140 configured to:

receive S110 the data 110;

identify S120 the one or more protected health information, PHI, elements 110' in the data 110;

obscure S130 the one or more PHI elements 110' in the data 110 to provide de-identified data 110" comprising the one or more non-PHI elements;

transmit S140 the de-identified data 110" over the communication network 120; and receive S150 the de-identified data 110" at a remote terminal 150 for analysing the one or more non-PHI elements in the de-identified data 110" and for outputting analysis data corresponding to the non-PHI elements for performing a servicing or a maintenance operation on the medical imaging system.

The example processing arrangement illustrated in FIG. 3 includes a first processor 130 and a second processor 140.

The first processor 130 may form part of a first terminal 190. The first terminal 190 may be disposed at a first location such at as a medical imaging facility. The first terminal 190 may for example be a workstation, or a thin client configured to control the medical imaging system. The first terminal 190 may be disposed permanently or temporarily at the first location. Thus, it is contemplated that the first terminal 190 may be a static processing device such as a workstation, a desktop computer, and so forth, or indeed a mobile processing device such as a laptop, or a smart phone, or a tablet, and so forth.

The second processor 140 illustrated in FIG. 3 forms part of a remote terminal 150. The remote terminal 150 may be located at a second location, for example at a servicing or maintenance facility at which a servicing and/or maintenance operation relating to the medical imaging system is to be remotely investigated. The remote terminal 150 may also be located elsewhere. For example, the remote terminal may be provided by a server in a remote geographical location, or it may be provided by a processing capability within the Cloud. Thus, it is contemplated that the first and second processors may individually be provided by a distributed processing arrangement wherein some aspects of the processing are performed by one or more processors that are disposed in the first and/or second locations, and wherein other aspects of the processing are performed elsewhere.

The communication network 120 illustrated in FIG. 3 may be any type of communication network. By way of some examples, the communication network 120 may be a local area network, or a wide area network. The communication network 120 may be a wireless network such as a mobile telephone network, or a wired network such as an electrical cable or optical fiber network. The communication network 120 may also be provided by the Internet.

Data 110 that is generated by various types of medical imaging systems may be transferred using the system illustrated in FIG. 3. The medical imaging system may for example be an X-ray imaging system, or a CT imaging system, or an "MRI" system, a positron emission tomography "PET" imaging system, a single photon emission computed tomography "SPECT" imaging system, an ultrasound imaging system such as an intravascular ultrasound "IVUS" imaging system, an optical coherence tomography "OCT" imaging system, and so forth. The data 110 may represent one or more images that are generated by the medical imaging system. The images may be reconstructed images that are generated by the medical imaging system. The images may be static images or live images. Moreover, the data 110 may include non-PHI elements, as well as PHI elements 110'. The images may include non-PHI elements such as an image artifact, as well as PHI elements 110' such as for example a patient name, a patient date of birth, and so forth. In these examples the PHI elements 110' may be present in the data 110 as image features that are characteristic of an individual patient, such as a characteristic skull, bone, or organ shape, for example. Alternatively, the PHI elements 110' may be present as text, such as a date of birth, that is embedded within the images.

With reference to the example system and method illustrated respectively in FIG. 3 and FIG. 4, in the operation S110 the data 110 is received by the processor 130. In some examples the data 110 is received from a medical imaging system. In other examples the data 110 is received from a computer or a computer readable storage medium. The data 110 may therefore be received as live data, or it may have been previously recorded. In yet other examples that are described in more detail below, the data 110 is received from a camera that is configured to capture the data 110 that is generated by the medical imaging system.

In the operation S120 illustrated in FIG. 3 and FIG. 4, or more PHI elements 110' in the data 110 are identified, and in the operation S130, the one or more PHI elements 110' are obscured to provide de-identified data 110" that includes the one or more non-PHI elements. The identification and the obscuring is performed automatically in the operations S120 and S130. This ensures that the de-identification is performed reliably. The operation S120 may be performed using optical character recognition "OCR", or by analysing the data 110 using an artificial intelligence algorithm that is trained to detect PHI elements.

If the data 110 includes image data, PHI elements 110' that are identified in the operation S120 may be obscured in the operation S130 by for example replacing pixel or voxel values corresponding to the PHI elements with default values such as a default grayscale or colour value, or a random value representative of noise. Alternatively, the pixel or voxel values corresponding to the PHI elements may be replaced with surrogate data such as a default image, a blurred image, a default name, or a default date of birth, and so forth. Likewise, if the data 110 includes text data, identified PHI text elements may be deleted, or replaced with default data. Such text may be identified from image data in the operation S120, or from text data if the data generated by the medical imaging system includes text data.

Various techniques are known for identifying PHI in image data. By way of an example, a technique for de-identification of MR image data that includes facial features that are characteristic of an individual patient, is disclosed in a document US 2020/0118317 A1. In this technique, facial features in the MR images are obscured by identifying voxels/pixels that represent face surface components, and replacing their values with random noise values to form a noisy face layer. The noisy face layer acts as a mask to de-identify or mask facial information in the image. The pixel/voxel values that are replaced are extended outwardly in order to preserve features such as the brain.

By way of another example, document US 2013/0054268 A1 discloses a technique wherein sample image snippets that represent PHI, such as phrases or fonts, are transformed and multiplied by source images to identify corresponding PHI in the source images.

By way of another example, document US 2021/0065881 A1 discloses various machine learning systems for identifying and replacing PHI information in images. Various neural networks are disclosed that use a text, OCR, and image classifiers to identify images that include PHI.

By way of another example, OCR may be used to identify PHI elements 110' in the operation S120, by detecting text in the data 110, and comparing the detected text with the database of words that are indicative of PHI elements. The database may for example include words such as "date of birth", "patient name", "patient number", and so forth. The PHI elements 110' in the data 110 may be obscured by replacing the pixel values of the image that is represented in the data 110, by default pixel values such as greyscale black or greyscale white values, or by default fields such as a default name "John Doe" and a default date of birth "1.1.2001" and so forth.

In some examples, in addition de-identifying data that is generated by a medical imaging system, PHI elements in audio data that is generated contemporaneously with the data generated by the medical imaging system, may also be identified, obscured, and transmitted, in a similar manner. Such audio data may be captured during operation of the medical imaging system, and may inadvertently capture a conversation between medical professionals about a patient, and might therefore include PHI elements such as a spoken name of the patient. Such PHI elements may also be identified in the operation S120, for example by analysing the audio data with a natural language processing "NLP" technique. The PHI elements may be obscured in the operation S130, for example by replacing the PHI elements 110' with a silence, or a noise representative of background hiss, or another noise such as a beep, and so forth. De-identifying the voice data as well as the data generated by the medical imaging system in this manner provides a further safeguard that the data transmitted by the system 100 does not include PHI elements.

In the operation S140, the processing arrangement transmits the de-identified data 110" over the communication network 120. This operation may be performed by the one or more processors 130 illustrated in FIG. 3. In this respect, the data may be transmitted using various data processing applications, including using applications such as an email application, a messaging application, a screen sharing application, and a telephonic application. As mentioned above, the first terminal 190 may for example be a workstation, or a thin client configured to control the medical imaging system, or it may be a mobile processing device such as a laptop, or a smart phone, or a tablet, and so forth. Thus, the application may be executed on a processor of one of these example systems.

In the operation S150, the de-identified data 110" is received at the remote terminal 150. The remote terminal 150 may also be configured to analyse one or more non-PHI elements in the de-identified data 110", and to output analysis data corresponding to the non-PHI elements for performing a servicing or a maintenance operation on the medical imaging system. The remote terminal 150 may include a second processor 140 that performs these operations, as described above. The functionality provided by the remote terminal may be provided by an individual processor, or multiple processors. The functionality provided by the remote terminal 150 may alternatively be provided by a distributed processing arrangement wherein some processing is performed in one or more processors that are disposed in the remote terminal, whereas other processing may be performed elsewhere, such as in the Cloud.

Various techniques may be used to analyse the de-identified data that is received in the operation S150. In one example, the operations of analysing the one or more non-PHI elements in the de-identified data 110", and outputting analysis data, may be performed by a neural network. In this example, the neural network is trained using ground truth data to classify inputted data as pertaining to one or more root causes, or as pertaining to one or more maintenance schedules. The neural network may for example be trained to identify image artifacts and to suggest improved parameters for controlling the medical imaging system such as disclosed in document WO 2019/201968 A1. In this document, a list of suggested pulse sequence command changes is generated by inputting a magnetic resonance image and image metadata into a neural network. The suggested pulse sequence command changes include an image improvement likelihood score.

By way of another example, the operations of analysing the one or more non-PHI elements in the de-identified data 110", and outputting analysis data that are performed by the remote terminal, may be performed by an analyzer as disclosed in document US 2011/110572 A1. In this document, an image analyzer is disclosed for automatically parsing and analyzing data representing an image of a particular anatomical feature of a patient acquired by a medical image acquisition device to identify defects in said image. Corrected image acquisition parameters are provided for use in re-acquiring an image.

By way of another example, techniques such as those disclosed in document WO 2019/086365 A1 may be used to identify artifacts in ultrasound image frames, in the operations of analysing the one or more non-PHI elements in the de-identified data 110", and outputting analysis data. In this document an instruction for adjusting an ultrasound transducer based on the presence and type of artifact present within an ultrasound image frame, is provided. By way of another example, a neural network may be trained to recognise image acquisition parameters that are displayed in a medical image. In this example, the neural network may be trained to analyse the image acquisition parameters and the medical image in order to output suggested improved image acquisition parameters that may be used to obtain a medical image with improved image quality. Image quality issues such as signal to noise ratio may be improved in this manner.

By way of another example, a neural network may be trained to recognise image annotations that are generated by automated image analysis techniques. In this example, incorrect annotations may be reported, and characteristics of the medical images that trigger such incorrect annotations may be outputted.

In some examples, the de-identified data is encrypted prior to being transmitted. This advantageously provides an additional safeguard to protect against the potential for data to be mis-used. Thus, in these examples, the processing arrangement is further configured to encode the de-identified data 110" with a data encryption algorithm prior to transmitting S140 the de-identified data 110" over the communication network 120. This operation may be performed by the one or more processors 130 illustrated in FIG. 3. Examples of algorithms that may be used for this purpose include Advanced Encryption Standard "AES", triple data encryption algorithm "TDEA/3DES", and the RSA Asymmetric Encryption Algorithm.

In some examples, the processing arrangement is further configured to store the de-identified data 110" to a computer readable storage medium. This operation may be performed by the one or more processors 130 illustrated in FIG. 3. The computer readable storage medium may be disposed within the first terminal 190, or at a remote location, such as in the Cloud, for example.

In some examples, the processing arrangement is further configured to augment the de-identified data 110" with an indicator representing that the data 110 has been de-identified. This operation may be performed by the one or more processors 130 illustrated in FIG. 3. The indicator may be used to prevent that the data 110 is re-analysed for de-identification purposes. This improves the efficiency of the system 100. In one example, an indicator may be provided in the form of a thumbnail image in order to visually indicate the status of a file representing the de-identified data 110". In another example, an indicator may be provided in the form of a hash code. The hash code may represent one or more file properties, such as the image size, its creation date, or the image itself. Such hash codes may be used to prevent subsequent tampering with the de-identified data. The indicator may be stored within a file representing the de-identified data 110", or as a separate file.

In some examples, the operations of receiving S110 the data 110, identifying S120 one or more PHI elements 110' in the data 110, and obscuring S130 the one or more PHI elements 110' in the data 110, and transmitting S140 the de-identified data 110", are performed in real-time. Performing these operations in real-time may permit a more efficient analysis of the data. For example, in a scenario wherein an operator at the medical imaging facility is engaged in a screen sharing operation with a service engineer, the service engineer may request the operator to adjust various settings of the medical imaging system, or to show or zoom-in on particular aspects of the data generated by the medical imaging system, in order to assist in an analysis of the data. In this scenario, the data 110 generated by the medical imaging system may represent static images or video images. Since only de-identified data 110" is transmitted to the remote terminal 150, it may be ensured that the data is analysed efficiently whilst complying with the necessary privacy regulations concerning PHI.

Figures 5, 6:
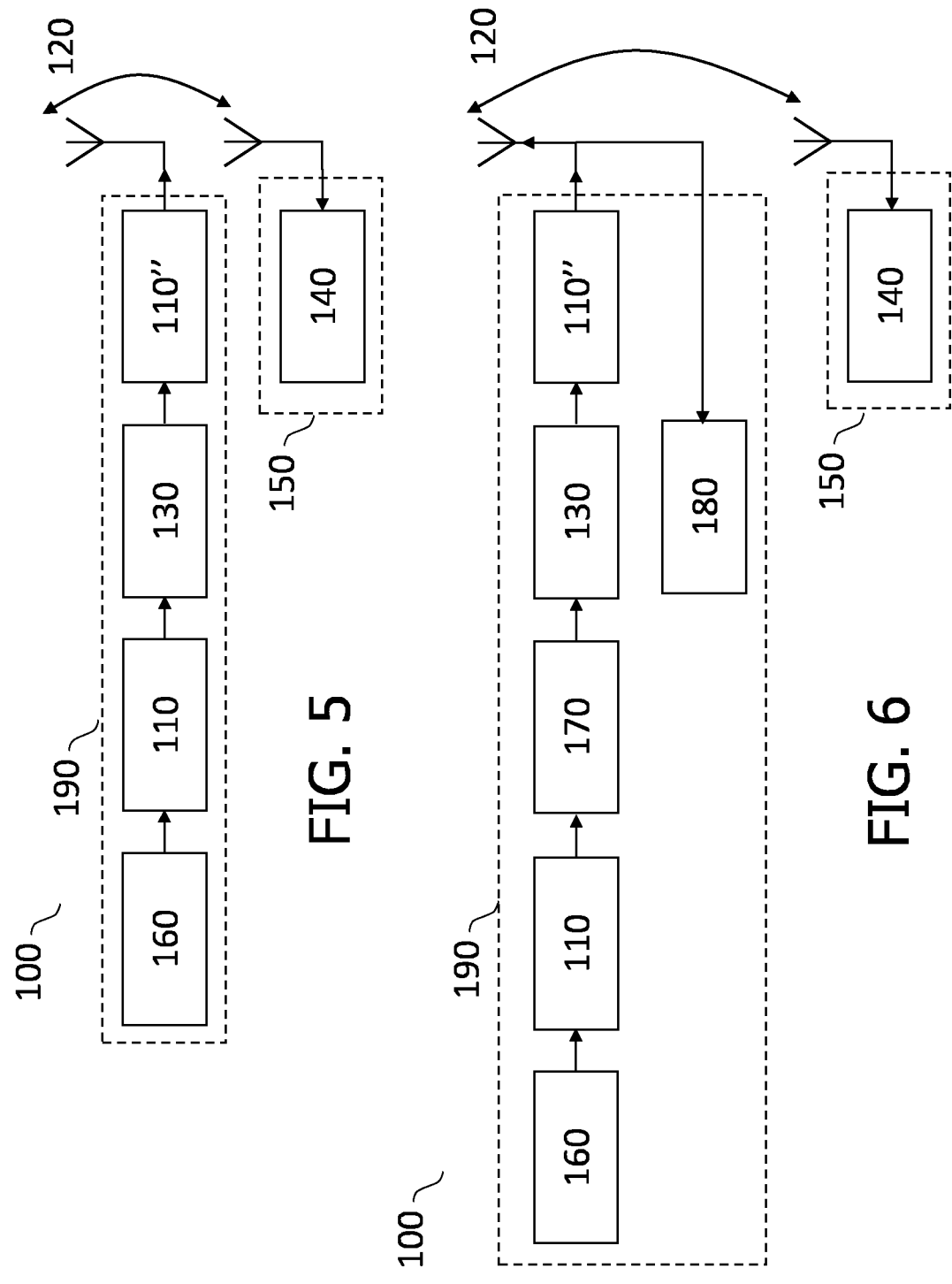
FIG. 5 is a schematic diagram illustrating a second example of a system 100 for transferring data over a communication network 110, in accordance with some aspects of the present disclosure.
FIG. 6 is a schematic diagram illustrating a third example of a system 100 for transferring data over a communication network 110, in accordance with some aspects of the present disclosure.

FIG. 5 is a schematic diagram illustrating a second example of a system 100 for transferring data over a communication network 110, in accordance with some aspects of the present disclosure. Features in FIG. 5 that have the same labels as in FIG. 4 provide the same functionality as that described in relation to FIG. 4. The example system 100 illustrated in FIG. 5 differs from the example system illustrated in FIG. 4 in that the system 100 illustrated FIG. 5 additionally includes a camera 160 that is configured to capture the data 110. The camera 160 may capture images that include data 110, or more specifically image data 110, that is generated by a medical imaging system. With reference to FIG. 2, the camera 160 may for example capture a view such as the view within the dashed lines in FIG. 2, and which includes medical image data that is generated by a medical imaging system. The view illustrated in FIG. 2 includes a medical image that is generated by the medical imaging system, and the medical image includes PHI elements 110' such as a patient name associated with the medical image. Returning to FIG. 5, the image data 110 that is captured by the camera 160, and which includes data 110 that is generated by a medical imaging system, may be processed by the processor 130 in the same manner as described with reference to FIG. 4, to provide de-identified data 110" and which is then transmitted over the communication network 120 in the operation S140 and received in the operation S150 as described above. In other words, PHI elements 110' such as a patient name in the image that is captured by the camera 160, are obscured by the processor 130, prior to transmitting the de-identified data 110" over the communication network 120.

With reference to FIG. 5 the first terminal 190 may be a processing device such as a smartphone, or a tablet, or a laptop or desktop computer desktop computer. The camera 160 may be integrated within the first terminal, such as in a smartphone or a laptop or a tablet. Alternatively, the camera may be in wired or wireless communication with the processor 130. For example, the camera may be coupled to the processor by means of a universal serial bus "USB" connector, or via a wireless Bluetooth® connection and so forth. The camera 160 illustrated in FIG. 5 may capture still images, i.e., static images, that include the data 110 that is generated by a medical imaging system, or alternatively it may capture video images, i.e., live, or real-time images that include the data 110 that is generated by a medical imaging system.

In some scenarios, the one or more processors 130 disposed in the first terminal 190 may receive other data as well as the data that is generated by the medical imaging system. This data may be also processed in accordance with the operations illustrated in FIG. 4. For example, the image data 110 that is captured by the camera 160 illustrated in FIG. 5 may also capture PHI elements that are not generated by the medical imaging system. For example, the view illustrated in FIG. 2 within the dashed lines might include PHI elements such as the face of a patient lying on the patient table illustrated in FIG. 2. In one example, these PHI elements that are captured by the camera, and which are not generated by the medical imaging system, are also identified and obscured in the same manner as the data that is generated by the medical imaging system.

In another example, the one or more processors 130 disposed in the first terminal 190 also receive audio data. The audio data may inadvertently include a conversation about a patient represented in the medical image generated by the medical imaging system. Such a conversation may include PHI elements. For example, a patient's name might be mentioned in order to confirm their identity. In this example, the audio data may be captured contemporaneously with video data that is captured by the camera 160, and the audio data may also be processed by the example system illustrated in FIG. 5 in a similar manner. The video data is captured by the camera 160 as described above. An additional microphone (not illustrated in FIG. 5), is also in communication with the one or more processors 130, and is configured to generate the audio data. The microphone may be integrated within one of the example types of first terminal 190 described above, or alternatively the microphone may be in wired or wireless communication with the processor 130. The microphone may generate audio data contemporaneously with the video data that is generated by the camera 160. The audio data may also be processed in accordance with the operations S110 to S150 illustrated in FIG. 4, in order to ensure that any audio data that is transmitted over the communications network 120 has also been de-identified. The audio data also may be received from the microphone in the operation S110. Audio PHI elements, such as for example a name or a date of birth, may be identified in the audio data in the operation S120 by analysing the audio data. The audio data may for example be converted to text using a voice-to-text algorithm. PHI elements may be identified by comparing the converted audio data in text form, with a lookup table including keywords indicative of the imminent mention of a PHI element. The lookup table might include words such as "the date of birth is" or "the patient's name is". Alternatively, a natural language processing "NLP" technique may be used to identify PHI elements. The identified PHI elements are then obscured in the operation S130, for example by replacing the PHI elements 110' with a silence, or a noise representative of background hiss, or another noise such as a beep, and so forth. The de-identified audio data that is generated in the operation S130, is then transmitted over the communication network 120 in the operation S140, and received at the remote terminal 150 in the operation S150. De-identifying the audio data in this manner provides an additional safeguard against the potential mis-use of the PHI.

FIG. 6 is a schematic diagram illustrating a third example of a system 100 for transferring data over a communication network 110, in accordance with some aspects of the present disclosure. Features in FIG. 6 that have the same labels as in FIG. 5 provide the same functionality as that described in relation to FIG. 5. The example system 100 illustrated in FIG. 6 differs from the example system illustrated in FIG. 5 in that the system 100 illustrated FIG. 6 additionally includes a volatile memory 170 and a non-volatile memory 180. In FIG. 6, the camera 160 is configured to transfer the image data that is generated by the camera to the volatile memory 170 prior to transferring the image data to the non-volatile memory 180. Moreover, the processing arrangement is configured to receive the image data from the volatile memory 170, and to output the de-identified image data to the non-volatile memory 180, such that the image data is not transferred to the non-volatile memory 180 prior to the identifying S120 the one or more PHI elements 110' and the obscuring S130 the one or more PHI elements 110' in the image data. These operations may be performed by the one or more processors 130 illustrated in FIG. 5.

Volatile memory requires power to be supplied in order to retain stored information. Current examples of volatile memory include static RAM "SRAM" and dynamic RAM "DRAM". By contrast, non-volatile memory can retain stored information after power has been disconnected. Current examples of non-volatile memory include flash memory, and magnetic storage devices such as hard disks. Advantageously, the example system described with reference to FIG. 6 retains de-identified information in non-volatile memory, even after power has been disconnected from the non-volatile memory, whereas PHI elements are only stored in volatile memory, which is erased when the power is disconnected. Thus, the de-identified data is stored in a way that it can be used for later reference, for example to assist in performing a servicing or a maintenance operation on the medical imaging system, whilst safeguarding against potential mis-use of PHI that is captured by the camera.

Further examples are described below that also include a camera 160 to generate image data that includes data 110 generated by a medical imaging system. These examples may be provided in accordance with the system 100 described above with reference to FIG. 5, or the system 100 described above with reference to FIG. 6.

In one example, the processing arrangement is further configured to:

assign a probability to the identified one or more PHI elements 110' in the image data, the probability representing a likelihood of the element being PHI; and for PHI elements 110' having a probability exceeding a threshold value:

to output to a display, the image data including the identified one or more PHI elements 110';

to output to the display, a prompt requesting user input confirming the identified one or more PHI elements 110' as representing PHI; and wherein the obscuring S130 the one or more PHI elements 110' in the image data to provide de-identified image data, is performed contingent on receiving the user input confirming the identified one or more PHI elements 110' as representing PHI.

These operations may be performed by the one or more processors 130 illustrated in FIG. 5 and FIG. 6. Allowing a user to accept or reject the assessment that is performed by the processor in this way may permit the preservation of important features in the data by preventing them from being obscured unnecessarily. This may be useful in cases in which the identification performed in the operation S120 does not definitively identify the information as representing PHI. For example, if the camera captures partially-obscured PHI elements, such as a portion of a face, the processor might indicate via the probability that these partially-obscured elements potentially represent PHI elements. The user can then decide whether or not these elements are to be de-identified, prior to the data being transmitted in the operation S140. In this example, the probability may be assigned by an algorithm, or by a neural network that identifies the PHI elements in the operation S120. Classification-type neural networks such as may be used in the operation S120 typically output such a probability when performing classification tasks. The threshold value may be adjustable based on user input. For example, it may be set to a high level if the camera is operated in a setting in which a user does not expect it to capture image data that includes PHI. This may be the case when capturing an image of a display of the medical imaging system when it is generating an image of a phantom. The threshold can therefore be used to limit the rate of such prompts. Alternatively, the threshold may be set to a low level if the camera is operated in a setting in which it is more likely to include PHI, such as when the medical imaging system is generating an image of a patient.

In another example, the processing arrangement is configured to identify the one or more PHI elements 110' in the image data by inputting the image data into a neural network trained to identify the PHI elements. In this example, the processing arrangement further re-trains the neural network in response to the user input confirming the identified one or more PHI elements 110' as representing PHI. This operation may be performed by the one or more processors 130 illustrated in the Figures. It may also be performed in-part by one or more further processors that are networked in a distributed processing arrangement, such as in the Cloud. In so doing, the accuracy of the analysis performed by the system may be tailored to settings in which the system is used. The processing arrangement may for example save the image data as new training data, together with the ground truth classification that is provided by the user, i.e. "PHI" or "non-PHI", and use the image data and its ground truth classification to periodically re-train the neural network by inputting the new training data into the neural network and adjusting its parameters until the neural network correctly classifies the new training data.

In another example, the processing arrangement is configured to:

assign a probability to the identified one or more PHI elements 110' in the image data, the probability representing a likelihood of the element being PHI; and for PHI elements 110' having a probability exceeding a threshold value:

to transmit the data 110 including the identified one or more PHI elements 110' over the communication network 120 to a server; and to receive, from the server, the data wherein the identified one or more PHI elements 110' have been obscured.

These operations may be performed by the one or more processors 130 illustrated in the Figures. In so doing, the analysis of PHI elements that have probability values that exceed the threshold value may be confirmed by the server. The server may have additional processing capabilities, and may therefore provide a more accurate assessment of the data. In some cases, PHI elements that have probability values that are within a predetermined range may be transmitted to the server in this manner. Consequently, data that is within the predetermined range, and which results in an inconclusive analysis, may be sent to the server, whereas data that results in a definitive analysis may be automatically de-identified by the one or more processors 130 as necessary, thereby limiting need for verification by the server and an associated delay.

In another example, the system 100 also includes a display and a touchscreen. In this example, the processing arrangement is further configured to:

output the image data to the display;

receive, from the touchscreen, user input indicative of at least one further region including a PHI element; and obscure the at least one further region in the image data such that the at least one further region is obscured in the de-identified image data.

These operations may be performed by the one or more processors 130 illustrated in the Figures. The user may provide the input by outlining the PHI element on the display via the touchscreen, or dragging a predefined shape over the PHI element, for example. Allowing the user to input an assessment in this manner provides an additional safeguard since it allows the user to identify PHI that is not recognised automatically in the operation S120.

In another example, the data represents one or more medical images generated by the medical imaging system. The one or more medical images may also comprise one or more image artifacts. In this example, the processing arrangement 130 may output the data, including the one or more medical images generated by the medical imaging system, to a display. The processing arrangement 130 may receive user input identifying a portion of the one or more image artifacts for analysis. The user input may be received from a user input device such as a touchscreen, a keyboard, or a mouse, for example. The user input may for example include an annotation, such as the word "artifact". The user input may for example define the portion of the one or more image artifacts by way of a shape outlining the one or more artifacts. The processing arrangement 130 may include the user input in the transmitted de-identified data in order to facilitate analysis of the image artifact.

In another example, the data represents one or more medical images generated by the medical imaging system, and the one or more medical images comprise one or more image artifacts, and the operation of obscuring S130 the one or more PHI elements 110' in the data, is performed such that at least a portion of the one or more image artifacts are present in the de-identified data. In this example, the processing arrangement 130 outputs the data, including the one or more medical images generated by the medical imaging system, to a display. The processing arrangement 130 receives user input identifying a portion of the one or more image artifacts for analysis. The user input may be received from a user input device such as a touchscreen, a keyboard, or a mouse, for example. The user input may for example include an annotation, such as the word "artifact". The user input may for example define the portion of the one or more image artifacts by way of a shape outlining the one or more artifacts. The processing arrangement 130 may include the user input in the transmitted de-identified data in order to facilitate analysis of the image artifact. In this example, the obscuring of the one or more PHI elements 110' in the data 110 is performed such that the data within the user-identified region is not obscured. If the operation S120 identifies one or more PHI elements in the data within the user-identified region, the processing arrangement may highlight the PHI elements on the display, and request user input on whether the PHI elements within the user-identified region should be obscured, and if so, obscure the PHI elements, or alternatively, whether the user-identified region should be adjusted.

The nature of image artifacts naturally depends on factors such as the imaging modality used for the image data acquisition and acquisition, and the image formation and image processing algorithm parameters. Examples of image artifacts are ring-shaped brightness variations on CT images which point to problems with the x-ray detector or its settings, star-shaped artifacts which point to problems with mechanical alignment, and streak artifacts which point to metallic or other highly attenuating objects or regions in the x-ray beam path. Furthermore, patient motion as well as poor gating in case of cardiac or thorax exams may lead to blurring artefacts or apparent discontinuity of anatomic structures. Examples related to MR Imaging include noise, motion, aliasing, chemical shift, Gibbs, susceptibility, and RF-interference. Noise-related artifacts can, e.g., be introduced by external devices like LED lamps as well as contrast injectors. Gibbs artifacts, also known as truncation, ringing, or spectral leakage artifacts, typically appear as multiple fine parallel lines immediately adjacent to high-contrast interfaces. These artifacts are particularly problematic in spinal imaging, in which they may artifactually widen or narrow the cord or mimic a syrinx.

Such image artifacts can be detected, and thereby preserved in the de-identified image data by inputting the image data to a neural network that is trained to detect the artifacts, and preserving regions in the images that represent artifact. Depending on the nature of the artifacts, specific alerts to servicing or maintenance operations can be triggered.

In so doing, a servicing or a maintenance operation may be performed on the medical imaging system to investigate an origin of the image artifact(s) in the medical image, whilst safeguarding against potential mis-use of the PHI in the original image generated by the medical imaging system.

In another example, a computer-implemented method of transferring data 110 generated by a medical imaging system over a communication network 120, is provided. The method includes:

receiving S110 the data 110;

identifying S120 one or more protected health information, PHI, elements 110' in the data 110;

obscuring S130 the one or more PHI elements 110' in the data 110 to provide de-identified data 110";

transmitting S140 the de-identified data 110" over the communication network 120; and receiving S150 the de-identified data 110" at a remote terminal for analysing one or more non-PHI elements in the de-identified data 110" and for outputting analysis data corresponding to the non-PHI elements for performing a servicing or a maintenance operation on the medical imaging system.

In another example, a computer program product is provided. The computer program product includes instructions which when executed by at least one processor 130, 140 cause the at least one processor to carry out a method of transferring data 110 generated by a medical imaging system over a communication network 120. The method comprises:

receiving S110 the data 110;

identifying S120 one or more protected health information, PHI, elements 110' in the data 110;

obscuring S130 the one or more PHI elements 110' in the data 110 to provide de-identified data 110";

transmitting S140 the de-identified data 110" over the communication network 120; and receiving S150 the de-identified data 110" at a remote terminal for analysing one or more non-PHI elements in the de-identified data 110" and for outputting analysis data corresponding to the non-PHI elements for performing a servicing or a maintenance operation on the medical imaging system.

The above examples are to be understood as illustrative of the present disclosure, and not restrictive. Further examples are also contemplated. For instance, the operations described in examples relating to the system 100, may also be provided by the computer-implemented methods, or by the computer program product, or by a computer-readable storage medium, in a corresponding manner.

It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A system for transferring data generated by a medical imaging system over a communication network, the data comprising one or more non-PHI elements and one or more PHI elements, the system comprising a processing arrangement configured to:

receive the data;

identify the one or more protected health information, PHI, elements in the data;

obscure the one or more PHI elements in the data to provide de-identified data comprising the one or more non-PHI elements;

transmit he de-identified data over the communication network; and receive the de-identified data at a remote terminal for analysing the one or more non-PHI elements in the de-identified data and for outputting analysis data corresponding to the non-PHI elements for performing a servicing or a maintenance operation on the medical imaging system.

2. The system according to claim 1, wherein the data comprises at least one of: image data, text data, and audio data; and wherein the PHI elements respectively comprise at least one of: image elements, text elements, and audio elements.

3. The system according to claim 1, wherein the processing arrangement is configured to transmit the de-identified data over the communication network using an email application, or using a messaging application, or using a screen sharing application, or using a telephonic application.

4. The system according to claim 1, wherein the processing arrangement is further configured to encode the de-identified data with a data encryption algorithm prior to transmitting the de-identified data over the communication network.

5. The system according to claim 1, wherein the processing arrangement is further configured to store the de-identified data to a computer readable storage medium.

6. The system according to claim 1, wherein the processing arrangement is further configured to augment the de-identified data with an indicator representing that the data has been de-identified.

7. The system according to claim 1, wherein the receiving the data, the identifying one or more PHI elements in the data, and the obscuring the one or more PHI elements in the data, and the transmitting the de-identified data, are performed in real-time.

8. The system according to any previous claim 1, further comprising a camera configured to capture the data, and wherein the data comprises image data.

9. The system according to claim 8, further comprising a volatile memory and a non-volatile memory, and wherein the camera is configured to transfer the image data to the volatile memory prior to transferring the image data to the non-volatile memory; and wherein the processing arrangement is configured to receive the image data from the volatile memory, and to output the de-identified image data to the non-volatile memory, such that the image data is not transferred to the volatile memory prior to the identifying the one or more PHI elements and the obscuring the one or more PHI elements in the image data.

10. The system according to claim 8, wherein the data comprises image data and wherein the processing arrangement is further configured to:

assign a probability to the identified one or more PHI elements in the image data, the probability representing a likelihood of the element being PHI; and for PHI elements having a probability exceeding a threshold value:

to output to a display, the image data including the identified one or more PHI elements;

to output to the display, a prompt requesting user input confirming the identified one or more PHI elements as representing PHI; and wherein the obscuring the one or more PHI elements in the image data to provide de-identified image data, is performed contingent on receiving the user input confirming the identified one or more PHI elements as representing PHI.

11. The system according to claim 10, wherein the processing arrangement is configured to identify the one or more PHI elements in the image data by inputting the image data into a neural network trained to identify the PHI elements; and wherein the processing arrangement is further configured to re-train the neural network in response to the user input confirming the identified one or more PHI elements as representing PHI.

12. The according to claim 8, wherein the processing arrangement is further configured to:

assign a probability to the identified one or more PHI elements in the image data, the probability representing a likelihood of the element being PHI; and for PHI elements having a probability exceeding a threshold value:

to transmit the data including the identified one or more PHI elements over the communication network to a server; and to receive, from the server, the data wherein the identified one or more PHI elements have been obscured.

13. The system according to claim 8, further comprising a display and a touchscreen, and wherein the processing arrangement is further configured to:

output the image data to the display;

receive, from the touchscreen, user input indicative of at least one further region including a PHI element; and obscure the at least one further region in the image data such that the at least one further region is obscured in the de-identified image data.

14. The system according to claim 1, wherein the data represents one or more medical images generated by the medical imaging system.

15. The system according to claim 14, wherein the one or more medical images comprise one or more image artifacts, and wherein the obscuring the one or more PHI elements in the data, is performed such that at least a portion of the one or more image artifacts are present in the de-identified data.

\* \* \* \* \*